United States Patent
Morrison et al.

(10) Patent No.: US 9,361,104 B2
(45) Date of Patent: Jun. 7, 2016

(54) SYSTEMS AND METHODS FOR DETERMINING INSTRUCTION EXECUTION ERROR BY COMPARING AN OPERAND OF A REFERENCE INSTRUCTION TO A RESULT OF A SUBSEQUENT CROSS-CHECK INSTRUCTION

(75) Inventors: Gary R. Morrison, Austin, TX (US); William C. Moyer, Dripping Springs, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 1303 days.

(21) Appl. No.: 12/856,430

(22) Filed: Aug. 13, 2010

(65) Prior Publication Data

US 2012/0042153 A1 Feb. 16, 2012

(51) Int. Cl.
 - *G06F 11/14* (2006.01)
 - *G06F 9/30* (2006.01)
 - *G06F 9/38* (2006.01)
 - *G06F 11/07* (2006.01)

(52) U.S. Cl.
 CPC .......... *G06F 9/30076* (2013.01); *G06F 9/3826* (2013.01); *G06F 11/0721* (2013.01); *G06F 11/0751* (2013.01); *G06F 11/1479* (2013.01)

(58) Field of Classification Search
 CPC G06F 9/30076; G06F 9/3826; G06F 11/1479
 See application file for complete search history.

(56) References Cited

U.S. PATENT DOCUMENTS

| | | | | |
|---|---|---|---|---|
| 6,633,971 | B2 * | 10/2003 | Peng et al. | 712/218 |
| 7,318,169 | B2 * | 1/2008 | Czajkowski | 714/17 |
| 7,353,365 | B2 * | 4/2008 | Mukherjee et al. | 712/218 |
| 7,584,405 | B2 * | 9/2009 | Osecky et al. | 714/784 |
| 7,861,228 | B2 * | 12/2010 | Osecky et al. | 717/126 |
| 8,055,697 | B2 * | 11/2011 | Patra | 708/533 |

OTHER PUBLICATIONS

Barrington, "Subtraction Learning Games", kidspot.com.au, Mums' School Zone, no date, p. 1, retrieved from http://www.kidspot.com.au/schoolzone/Learning-games-Subtraction-learning-games+4251+316+article.htm.*
Wendy P, "Missing Addends, Cuisenaire Rods, 'trash can'", Mathcats.com, Addition and Subtraction Idea Bank, Feb. 12, 2001, p. 6, retrieved from http://web.archive.org/web/20010212100513/http://www.mathcats.com/grownupcats/ideabankaddition.html.*
Dawe, "How to Use Addition to Check Subtraction", eHow.com, no date, pp. 1-2, retrieved from http://www.ehow.com/how_8030835_use-addition-check-subtraction.html.*

(Continued)

*Primary Examiner* — David J Huisman
(74) *Attorney, Agent, or Firm* — Sherry W. Schumm

(57) ABSTRACT

In a data processing system having execution circuitry, a method includes providing a cross-check instruction and a reference instruction to the execution circuitry, where the reference instruction has an operand. The method also includes executing the reference instruction to obtain a first result. Residual information is derived from execution of the reference instruction, and the method also includes executing the cross-check instruction using the residual information to obtain a second result. The second result obtained from execution of the cross-check instruction is compared to the operand of the reference instruction to determine whether an error occurred during execution of the reference instruction or the cross-check instruction.

19 Claims, 3 Drawing Sheets

(56) References Cited

OTHER PUBLICATIONS

Austin, "DIVA: A Dynamic Approach to Microprocessor Verification", May 2000, pp. 1-26.*

Dudek, "Comparison Between Unsigned and Signed 2's Complement Binary Number Arithmetic (for n=5 bits)", Penn State University, Aug. 2000, pp. 1-3.*

Hsu, Y., et al., "Recomputing by Operand Exchanging: a Time-redundancy Approach for Fault-tolerant Neural Networks", IEEE, 1995, pp. 54-65.

Shareef, A., et al., "Selective Redundancy: Evaluation of Temporal Reliability Enhancement Scheme for Nanoelectronic Circuits", IEEE, 2008, pp. 895-898.

Karri, R., et al., "Algorithm Level Re-Computing Using Implementation Diversity: A Register Transfer Level Concurrent Error Detection Technique", IEEE, Transactions on Very Large Scale Integration (VLSI), vol. 10, No. 6, Dec. 2002, pp. 864-875.

Franklin, M., "A Study of Time Redundant Fault Tolerance Techniques for Superscalar Processors", IEEE, 1995, pp. 207-215.

Parashar, A., et al., "A Complexity-Effective Approach to ALU Bandwidth Enhancement for Instruction-Level Temporal Redundancy", IEEE, Proceedings of the 31st Annual International Symposium on Computer Architecture (ISCA '04), Jun. 2004, pp. 376-386.

Walcott, K., et al., "Dynamic Prediction of Architectural Vulnerability From Microarchitectural State", Technical Report CS-2007-05, Nov. 2006, pp. 1-23.

* cited by examiner

SYSTEMS AND METHODS FOR DETERMINING INSTRUCTION EXECUTION ERROR BY COMPARING AN OPERAND OF A REFERENCE INSTRUCTION TO A RESULT OF A SUBSEQUENT CROSS-CHECK INSTRUCTION

BACKGROUND

1. Field

This disclosure relates generally to data processing, and more specifically, to a data processing system having temporal redundancy and method therefor.

2. Related Art

Integrated circuit data processing systems used in safety-critical applications, such as those used in automotive anti-lock braking, generally require redundancy to detect soft (transient) and hard (permanent) failures. One redundancy technique, known as modular redundancy, provides two or more processors executing the same instructions in "lock-step". The actions of two fully operational processors running in lockstep are identical. An error is indicated when the processor outputs differ from each other. Running processors in lockstep to provide hardware redundancy is very expensive in both system cost and power consumption. It is also inflexible and effectively doubles the chances of failures occurring. Temporal redundancy is most commonly used to detect and correct soft errors. Temporal redundancy can be used to detect hard errors by re-performing operations in the same form, or in a different but equivalent form, to detect hard errors. However, there has been limited success in detecting and correcting hard errors.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
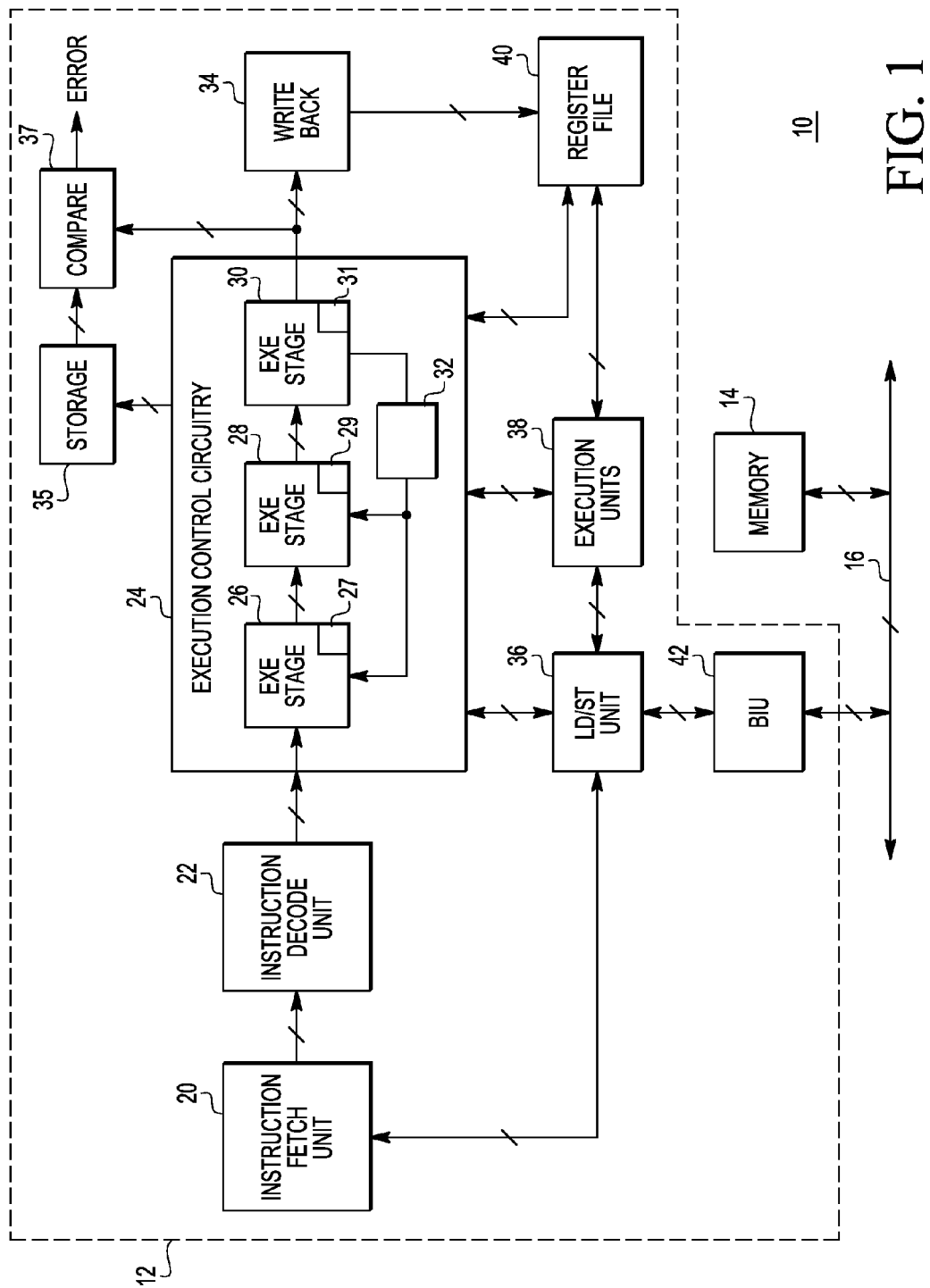
FIG. 1 illustrates, in block diagram form, a data processing system in accordance with an embodiment.

Generally, there is provided, a data processing system that implements temporal redundancy during normal instruction execution. The data processing system may be a pipelined data processing system having a plurality of execution stages. Instead of re-executing the same instruction, a different cross-check instruction is used to cross-check a reference instruction. The reference instruction may be a normal instruction used in a particular application and executed during normal operation of the data processing system. In one embodiment, the temporal redundancy algorithm includes the use of residual information that is derived from execution of the reference instruction. The residual information may be a carry bit, a borrow bit, or information that is shifted out, masked, toggled, truncated, or any other information required to reconstruct an operand from a result of executing the reference instruction, and from other operands. The residual information is then fed forward to a previous execution stage and used by the subsequent cross-check instruction to generate a cross-check result. The result can then be compared with an operand of the reference instruction to determine if an error occurred during execution of the reference instruction. In another embodiment, an operand used during execution of the reference instruction is fed forward to a previous execution stage. A subsequent cross-check instruction is then executed and the result of execution is compared to the stored operand. An error has occurred during execution of one of the reference instruction or the cross-check instruction if the result does not match the operand.

By using a subsequent cross-check instruction that is different than the reference instruction to check execution of the reference instruction, hard (permanent) failures can be detected that could not be detected by re-executing the same instruction. The use of temporal redundancy in conjunction with built-in self testing (BIST) and cyclic redundancy check (CRC) mechanisms can reduce the need for lockstep processing.

In one aspect, there is provided, in a data processing system having execution circuitry, a method comprising: providing a reference instruction to the execution circuitry, the reference instruction having an operand; providing a cross-check instruction to the execution circuitry; executing the reference instruction to obtain a first result, wherein, during the step of executing the reference instruction, residual information is derived from execution of the reference instruction; executing the cross-check instruction using the residual information to obtain a second result; and comparing the second result obtained from execution of the cross-check instruction to the operand of the reference instruction to determine whether an error occurred during execution of the reference instruction or the cross-check instruction. Knowing that the result is unreliable, in some usages, may be more important than determining which result, if either, is correct. The step of executing the cross-check instruction may be performed such that the residual information is used as an operand of the cross-check instruction. The method may further comprise selectively storing the first result to a register file of the data processing system based on whether or not the error occurred. The second result obtained from execution of the cross-check instruction may not be stored to the register file. Similarly, it may be that neither result is stored to the register file. The method may further comprise storing the second result obtained from execution of the cross-check instruction prior to the step of comparing the second result of the cross-check instruction to the operand. The step of providing the cross-check instruction to the execution circuitry may comprise providing the cross-check instruction to a first execution stage of the execution circuitry while advancing the reference instruction to a second execution stage of the execution stage of the execution circuitry, wherein the second execution stage is subsequent to the first execution stage. The first result is obtained and the residual information is derived in the second execution stage, and wherein the method may further comprise providing the residual information from the second execution stage to the first execution stage. The second execution stage may be immediately subsequent to the first execution stage. The method may further comprise storing the residual information prior to the step of providing the residual information to the first execution stage. The residual information may comprise a bit selected from a group consisting of a masked out bit, a carry bit, a shifted out bit, a toggled bit, and a truncated bit. The step of executing the reference instruction may comprise performing a first function selected from a group consisting of an arithmetic function and a logic function and the step of executing the cross-check instruction performs a second function selected from a group consisting of an arithmetic function and a logic function, wherein the second function is different from the first function. The first function may be one of a left shift or a right shift and the second function may be another one of a left shift or a right shift.

In another aspect, there is provided, a data processing system comprising: execution circuitry which receives a reference instruction and a cross-check instruction, wherein the execution circuitry executes the reference instruction to obtain a first result and residual information, wherein the residual information is derived from execution of the reference instruction, and the execution circuitry executes the cross-check instruction using the residual information to obtain a second result; comparison circuitry, coupled to the execution circuitry, which compares the second result obtained from execution of the cross-check instruction to an operand of the reference instruction, and generates an error indicator which indicates whether an error occurred during execution of the reference instruction or the cross-check instruction; and a register file, coupled to the execution circuitry and comparison circuitry, which selectively stores the first result in a register of the register file based on the error indicator. The execution circuitry may receive the cross-check instruction after receiving the reference instruction and the execution circuitry uses the residual information as an operand of the cross-check instruction to execute the cross-check instruction. The execution circuitry may not provide the second result for storage into the register file. The execution circuitry may further comprise a cross-check indicator which indicates whether a currently executing instruction is a cross-check instruction or not, and wherein the data processing system further comprises storage circuitry, separate from the register file, which stores the residual information. This cross-check indicator may also specify where in the pipeline a cross-check instruction for a particular reference instruction is located, such as directly after it, or two instructions later. The residual information may comprise a bit selected from a group consisting of a masked out bit, a carry bit, a shifted out bit, a toggled bit, and a truncated bit.

In yet another aspect, there is provided, in a data processing system having execution circuitry, a method comprising: providing a reference instruction to the execution circuitry, the reference instruction having an operand; providing a cross-check instruction to the execution circuitry; executing the reference instruction to obtain a first result and storing the operand of the reference instruction into a storage element; executing the cross-check instruction to obtain a second result; comparing the second result obtained from execution of the cross-check instruction to the operand of the reference instruction to determine whether an error occurred during execution of the reference instruction or the cross-check instruction; and selectively storing the first result to a register file of the data processing system based on whether or not the error occurred, wherein the storage element is not included as part of the register file. The second result may be obtained from execution of the cross-check instruction is not stored to the register file. The step of providing the cross-check instruction to the execution circuitry may comprise providing the cross-check instruction to a first execution stage of the execution circuitry while advancing the reference instruction to a second execution stage of the execution stage of the execution circuitry, wherein the second execution stage is subsequent to the first execution stage.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

FIG. 1 illustrates, in block diagram form, a data processing system 10 in accordance with an embodiment. Data processing system 10 includes processor 12, memory 14, and bus 16. Processor 12 includes instruction fetch unit 20, instruction decode unit 22, execution control circuitry 24, write back stage 34, load/store (LD/ST) unit 36, storage unit 35, comparator 37, execution units 38, register file 40, and bus interface unit (BIU) 42. Execution control circuit 24 includes a plurality of execution stages 26, 28, and 30, and a feed-forward storage element 32. Data can be fed forward from execution stage 30 to either of stages 26 and 28. Note that a different number of execution stages can be provided in another embodiment. Each of the execution stages 26, 28, and 30 includes cross-check instruction indicator information 27, 29, and 31, respectively. Storage element 32 can be any type of appropriate memory structure. For example, in one embodiment, storage element 32 may include storage elements in a fixed or variable length first-in, first-out (FIFO) structure. In another embodiment, a zero-length FIFO (no storage) is used. Memory 14 is bi-directionally connected to bus 16. Memory 14 can be any memory type having a plurality of volatile or non-volatile memory cells. Commonly used memory types include read only memory (ROM), static random access memory (SRAM), dynamic random access memory (DRAM), and flash memory. Data processing system 10 may include elements other than those illustrated, or may include more or fewer than those illustrated. For example, data processing system may include more or fewer processors and/or memories.

Processor 12 may be any type of processor, such as for example, a microprocessor, microcontroller, digital signal processor (DSP), or the like. Processor 12 may also be referred to as a processor core. In the illustrated embodiment, processor 12 is a pipelined processor. In processor 12, instruction fetch unit 20 is bi-directionally connected to LD/ST unit 36. Load/store unit 36 is also bi-directionally connected to BIU 42, execution control circuitry 24, and execution units 38. Execution control circuit 24 is bi-directionally connected to instruction decode unit 22, LD/ST unit 36, execution units 38, and register file 40. Execution control circuitry 24 is also connected to write back stage 34, storage element 35, and comparator 37.

Processor 12 communicates with other portions of data processing system 12, such as for example, memory 14 via BIU 42. During normal instruction processing, instruction fetch unit 20 fetches instructions from LD/ST unit 36. The instructions are then decoded by instruction decode unit 22 and provided to a first execution stage 26 of a multi-stage pipeline including execution stages 26, 28, and 30. After the last execution stage 30, at the end of the pipeline, a result is provided to write back unit 34 to be provided back to memory 14 via register file 40. Execution control circuitry 24 communicates with one or more of a plurality of execution units, as represented by execution units 38, as needed to execute an instruction. Also, data can be loaded from memory 14 to register file 40 as needed for executing instructions. Execution units 38 can perform arithmetic, logical, shifting, or other operations using data stored in register file 40 as needed for executing the instructions received from instruction fetch unit 20. Execution units 38 may include, for example, arithmetic logic units (ALUs), floating point units, etc. Register file 40 includes a plurality of general purpose registers (GPRs) and special purpose registers (SPRs). Register file 40 can provide or receive control information and data to or from execution control circuitry 24 and execution units 38. Register file 40 can receive data and control information from write back stage 34.

Cross-check instructions are inserted into the instruction execution path during normal operation of data processing system 10. The cross-check instruction is used to determine if there are execution errors resulting from soft errors or hardware failures. In general, the reference instruction may execute a first function, where the first function may be an arithmetic function, a logic function, or a change-of-flow instruction. The cross-check instruction performs a second function, where the second function may be an arithmetic function or a logic function. However, the second function is different from the first function. In one embodiment, the cross-check instruction uses residual information from the execution of a reference instruction to check the execution path of data processing system 10. The residual information may result from, for example, a barrel shift left operation. The information that was shifted out by the barrel shift left operation is used by a subsequent cross-check barrel shift right operation to determine if there was an execution error. In other embodiments, in general, the residual information may be, for example, a carry bit, information that was masked by an operation, toggled, or truncated.

In another embodiment, the cross-check instruction may be used to check a cumulative result. For example, the reference operation to be checked may be A+B=C, where A and B are operands and C is the result. The subsequently executed cross-check instruction may be C−B=A. The original operand information must be preserved for use by the cross-check instruction.

Cross-check indicator information 27, 29, or 31 is set when a corresponding one of execution stages 26, 28, and 30 is executing a reference instruction that is to be cross-checked for temporal redundancy. The cross-check indication information 27, 29, and 31 also includes the location of the cross-check instruction, such as where the cross-check instruction is located in the pipeline relative to the reference instruction. Note that cross-check indicator information 27, 29, and 31 can be associated with the cross-check instruction, the reference instruction, or both. In an embodiment, during execution of a reference instruction that has residual information, such as for example, shifted out residual information, the residual information from execution stage 30 is feed-forwarded to one of execution stages 26 or 28 for execution by the subsequent cross-check instruction. If necessary, the residual information can be temporarily stored in storage element 32. If the reference instruction includes an operand that must be preserved for the subsequent cross-check instruction, the operand is preserved in storage element 32. This may be needed in the event that the cross-check instruction cannot be scheduled immediately after the reference instruction because there may be intervening instruction(s) that overwrite the required operand. Some conventional execution control circuitry may already include a feed-forward path from an execution stage of the pipeline to previous execution stages; however, the conventional execution control circuitry exists to convey previous instruction execution results and not the original operands or residual information as described herein. Note that in other embodiments, the feed-forward path of execution control circuitry 24 may be implemented differently.

The results of the executed instructions are provided to write back unit 34. Write back unit 34 provides the results to register file 40. Also, the result of execution of a cross-check instruction is provided to one input of comparator 37 and the original operand of the reference instruction is provided to storage element 35. Comparator 37 compares the original operand to the cross-check result. If the result and operand are the same, then no errors were detected in the execution of the reference instruction and the cross-check instruction. If the result and operand are not the same, then an error was detected in the execution of either of the reference instruction, the cross-check instruction, or both, and an error signal labeled "ERROR" in FIG. 1 is provided.

In one embodiment, the cross-check instruction is executed immediately following the execution of the reference instruction. In another embodiment, the cross-check instruction can be executed at another time. For example, in traditional, pipelined instruction execution, sometimes "bubbles" develop during program execution that result in "dead time" or relatively inactive time periods of program execution where the processor is not executing instructions. The execution of the cross-check instructions may be deferred and executed during this dead time to make temporal redundant program execution to effectively incur no performance penalty.

Figure 2:
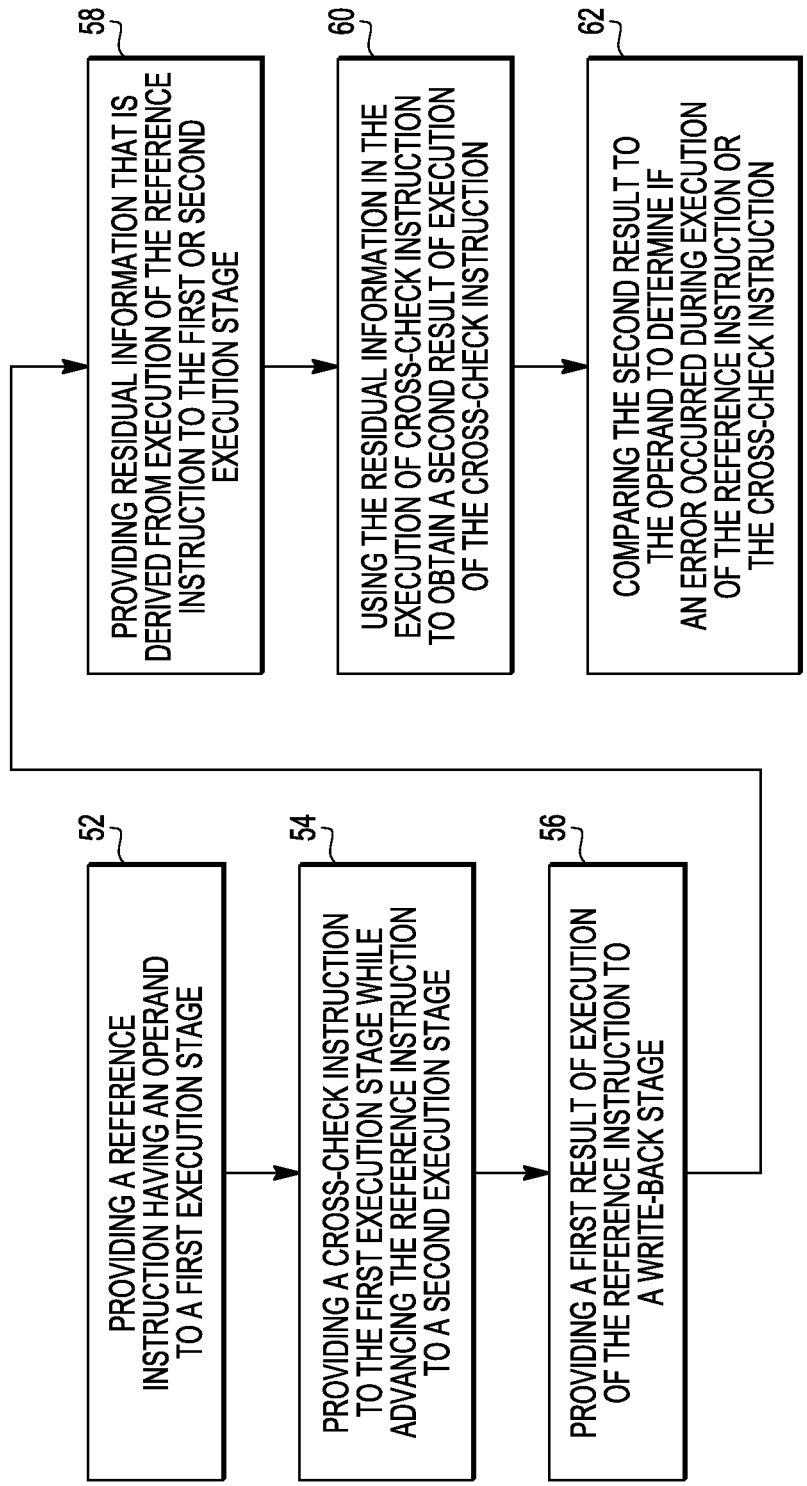
FIG. 2 illustrates a flow chart of a method for temporal redundancy in accordance with an embodiment.

FIG. 2 illustrates a flow chart of a method 50 for temporal redundancy in accordance with an embodiment. Method 50 is executed in data processing system 10. At step 52, a reference instruction having an operand is provided to a first execution stage 26 of execution control circuitry 24. The reference instruction may be a normal instruction in, for example, an anti-lock braking application. At step 54, a cross-check instruction is provided to the first execution stage while advancing the reference instruction to a second execution stage. The cross-check instruction is identified using cross-check indicator information 27. The second execution stage may be, for example, execution stage 30 in FIG. 1. At step 56, a first result of execution of the reference instruction is provided to write-back stage 34. Execution of the reference instruction results in residual information. That is, the residual information is not needed to produce a result and is normally discarded. One example of an operation that results in residual information is a barrel shift operation. At step 58, the residual information derived from execution of the reference instruction is provided to an execution stage of execution control circuitry 24. Generally, the residual information is provided to the first execution stage 26. In other embodiments, the residual information may be provided to a different one of execution stages 26, 28, or 30. At step 60, the residual information is used in the execution of the cross-check instruction to obtain a second result. In the case where the reference instruction is a barrel shift left, then the cross-check instruction may be a barrel shift right instruction that uses the residual information to recreate the operand. At step 62, the second result from execution of the cross-check instruction is compared to the original operand in comparator 37 to determine if an error occurred during execution of the reference instruction or the cross-check instruction. Comparator 37 will provide an ERROR signal if the original operand and the second result do not match. Note that the second result is not written back to register file 40 by write back stage 34.

Figure 3:
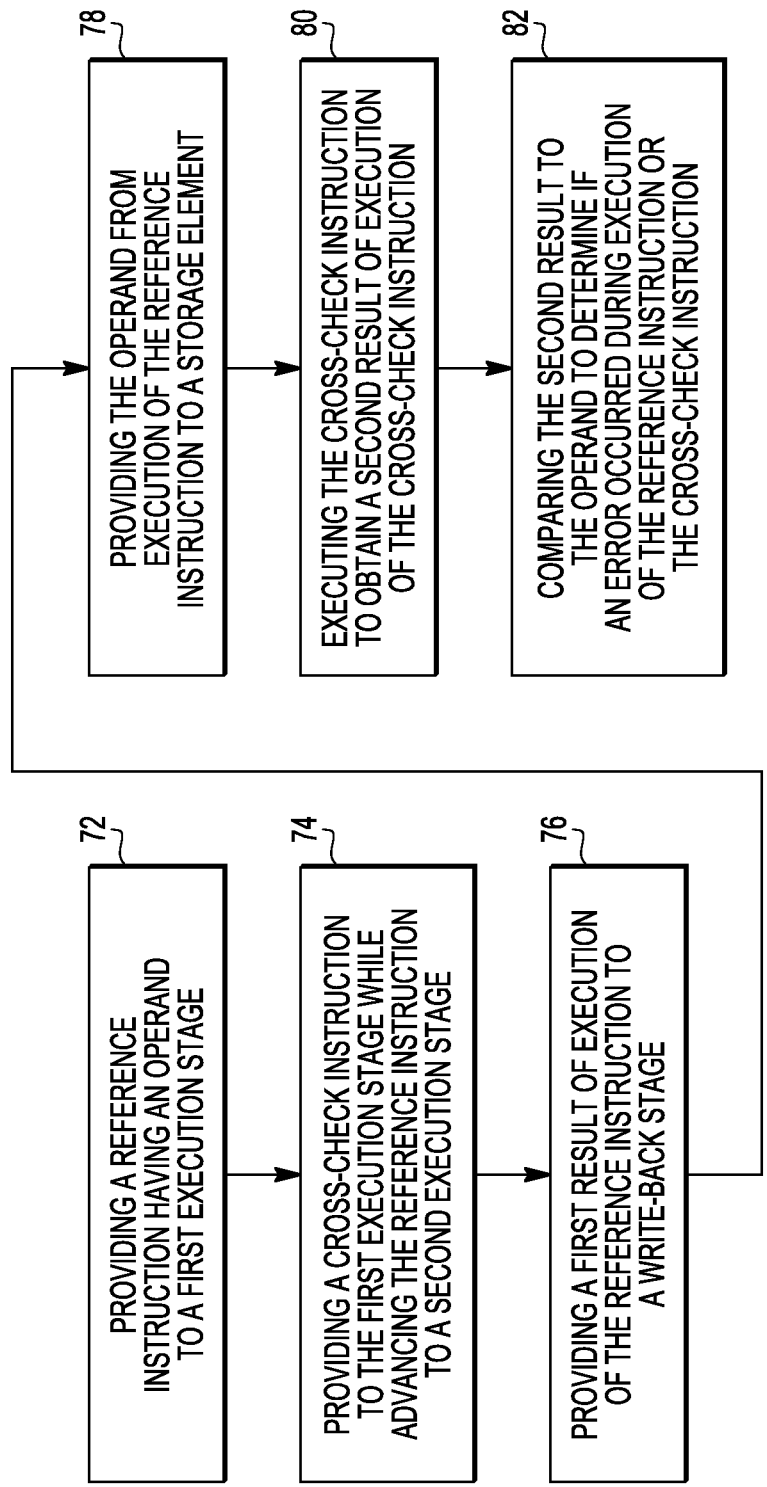
FIG. 3 illustrates a flow chart of a method for temporal redundancy in accordance with another embodiment.

FIG. 3 illustrates a flow chart of method 70 for temporal redundancy in accordance with another embodiment. Method 70 is executed in data processing system 10. At step 72, a reference instruction having an operand is provided to a first execution stage 26 of execution control circuitry 24. The reference instruction may be a normal instruction in, for example, an anti-lock braking application. At step 74, a cross-check instruction is provided to the first execution stage while advancing the reference instruction to a second execution stage. The second execution stage may be, for example, execution stage 30 in FIG. 1. At step 76, a first result of execution of the reference instruction is provided to write-back stage 34. At step 78, the operand from execution of the reference instruction is provided to storage element 35. In the illustrated embodiment, storage element 35 is not implemented as part of register file 40. At step 80, the cross-check instruction is executed to obtain a second result. At step 82, the second result of the execution of the cross-check instruction is compared to the original operand from step 72 to determine if an error occurred during execution of the reference instruction or the cross-check instruction. The result is compared against the operand because the cross-check instruction is chosen to recreate the operand by using the result of the reference instruction. Comparator 37 will provide an ERROR signal if the original operand and the second result do not match. Note that the second result is not part of a write back operation to register file 40. Also note that when performing some operations in another embodiment, step 78 could be performed earlier in the flow sequence to allow the cross-check instruction to issue earlier.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having execution circuitry that includes a plurality of execution stages arranged in a pipeline, a method comprising:
   providing a reference instruction to a first execution stage of the execution circuitry, the reference instruction having an operand;
   providing a cross-check instruction to the first execution stage of the execution circuitry while advancing the reference instruction to a second execution stage of the execution circuitry, wherein the cross-check instruction is different from the reference instruction, and wherein the second execution stage is subsequent to the first execution stage;
   executing the reference instruction to obtain a first result, wherein, during the step of executing the reference instruction, residual information is derived from execution of the reference instruction, wherein the residual information is distinct from the first result;
   providing the residual information from the second execution stage to the first execution stage along a feed-forward path between the second execution stage and the first execution stage;
   after providing the residual information from the second execution stage to the first execution stage along the feed-forward path, executing the cross-check instruction using the residual information to obtain a second result; and
   comparing, by a comparator coupled to the execution circuitry, the second result obtained from execution of the cross-check instruction to the operand of the reference instruction to determine whether an error occurred during execution of the reference instruction or the cross-check instruction.

2. The method of claim 1, wherein the step of executing the cross-check instruction is performed such that the residual information is used as an operand of the cross-check instruction.

3. The method of claim 1, further comprising:
   selectively storing the first result to a register file of the data processing system based on whether or not the error occurred.

4. The method of claim 3, wherein the second result obtained from execution of the cross-check instruction is not stored to the register file.

5. The method of claim 1, further comprising:
storing the second result obtained from execution of the cross-check instruction prior to the step of comparing the second result of the cross-check instruction to the operand.

6. The method of claim 1, wherein the first result is obtained in the second execution stage, and the residual information is derived in the second execution stage.

7. The method of claim 6, wherein the second execution stage is immediately subsequent to the first execution stage.

8. The method of claim 6, further comprising:
storing the residual information prior to the step of providing the residual information to the first execution stage.

9. The method of claim 1, wherein the residual information comprises a bit selected from a group consisting of a masked out bit, a shifted out bit, a toggled bit, and a truncated bit.

10. The method of claim 1, wherein the step of executing the reference instruction comprises performing a first function selected from a group consisting of an arithmetic function and a logic function, and the step of executing the cross-check instruction performs a second function selected from a group consisting of an arithmetic function and a logic function, wherein the second function is different from the first function.

11. The method of claim 10, wherein the first function is one of a left shift or a right shift and the second function is another one of a left shift or a right shift.

12. The method of claim 1, further comprising:
while executing the reference instruction in the second execution stage, setting a cross-check indicator that indicates that the reference instruction is to be cross-checked for temporal redundancy.

13. The method of claim 1, further comprising:
during the step of providing the residual information from the second execution stage to the first execution stage, temporarily storing the residual information in a storage element located along the feed-forward path between the second execution stage and the first execution stage.

14. A data processing system comprising:
execution circuitry that includes a plurality of execution stages arranged in a pipeline, wherein a first stage of the execution circuitry receives a reference instruction, and subsequently the first stage of the execution circuitry receives a cross-check instruction while the reference instruction is advanced to a second execution stage of the execution circuitry, wherein the cross-check instruction is different from the reference instruction, wherein the second execution stage is subsequent to the first execution stage, wherein the execution circuitry executes the reference instruction to obtain a first result and residual information, wherein the residual information is derived from execution of the reference instruction, wherein the residual information is distinct from the first result, and wherein the execution circuitry provides the residual information from the second execution stage to the first execution stage along a feed-forward path of the execution circuitry between the second execution stage and the first execution stage, and after providing the residual information from the second execution stage to the first execution stage along the feed-forward path, the execution circuitry executes the cross-check instruction using the residual information to obtain a second result;
comparison circuitry, coupled to the execution circuitry, which compares the second result obtained from execution of the cross-check instruction to an operand of the reference instruction, and generates an error indicator which indicates whether an error occurred during execution of the reference instruction or the cross-check instruction; and
a register file, coupled to the execution circuitry and the comparison circuitry, which selectively stores the first result in a register of the register file based on the error indicator.

15. The data processing system of claim 14, wherein the execution circuitry receives the cross-check instruction after receiving the reference instruction and the execution circuitry uses the residual information as an operand of the cross-check instruction to execute the cross-check instruction.

16. The data processing system of claim 14, wherein the execution circuitry does not provide the second result for storage into the register file.

17. The data processing system of claim 16, wherein the execution circuitry further comprises a cross-check indicator which indicates whether a currently executing instruction is a cross-check instruction or not, and wherein the data processing system further comprises storage circuitry, separate from the register file, which stores the residual information.

18. The data processing system of claim 14, wherein the residual information comprises a bit selected from a group consisting of a masked out bit, a shifted out bit, a toggled bit, and a truncated bit.

19. The data processing system of claim 14, further comprising:
a storage element located along the feed-forward path between the second execution stage and the first execution stage, wherein the storage element is used to temporarily store the residual information while providing the residual information from the second execution stage to the first execution stage.

* * * * *